June 29, 1926.

C. BOUIN 1,590,804

STEREOSCOPIC MOTION PICTURE CAMERA

Filed June 10, 1922

INVENTOR:
Charles Bouin

June 29, 1926.

C. BOUIN 1,590,804

STEREOSCOPIC MOTION PICTURE CAMERA

Filed June 10, 1922    4 Sheets-Sheet 2

INVENTOR:
Charles Bouin.

June 29, 1926.

C. BOUIN

STEREOSCOPIC MOTION PICTURE CAMERA

Filed June 10, 1922  4 Sheets-Sheet 3

1,590,804

INVENTOR=
Charles Bouin.

June 29, 1926.　　　　　　　　　　　　　　　　　1,590,804
C. BOUIN
STEREOSCOPIC MOTION PICTURE CAMERA
Filed June 10, 1922　　　4 Sheets-Sheet 4

INVENTOR:
Charles Bouin

Patented June 29, 1926.

1,590,804

UNITED STATES PATENT OFFICE.

CHARLES BOUIN, OF BOSTON, MASSACHUSETTS.

STEREOSCOPIC MOTION-PICTURE CAMERA.

Application filed June 10, 1922. Serial No. 567,455.

This invention relates to the production of stereoscopic motion pictures upon standard size film, and more particularly to a stereoscopic motion picture camera employing standard size film.

Some of the objects and advantages of the stereoscopic motion picture camera of this invention may be mentioned as follows:—

To register upon a standard size film stereoscopic images of scenes or objects or right and left pairs of images which are of the standard size of one inch by ¾ inch each and with such images in true horizontal alinement in relation to each other, and the right and left pairs of images being equal to stereoscopic distances from each other on the film. Such images or stereoscopic pairs run in a horizontal direction of length of film. The distance of the two lenses (right and left) equalling 2¼ inches, or between the two openings in film gate, there being a distance which is equal to two widths of images or 1½ inches, or any equal number of image widths, as indicated in Fig. 9.

Referring to the accompanying drawings.

Figs. 5, 6, 7, and 8, show different styles of shutters which may be used in either of the styles of camera mentioned, according to the results desired.

Figure 9:
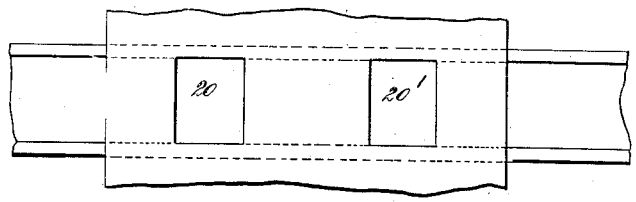

Fig. 9, show the openings in the film gate for a standard size film. The size of openings in film gate corresponding to the size of images photographed upon film.

Figure 10:
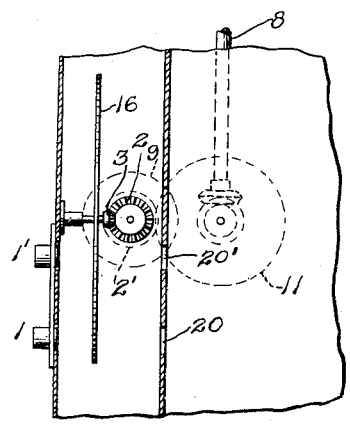

Fig. 10 is a cross-sectional plan view, showing position of shutter, or color screen when such is employed.

Figure 1:
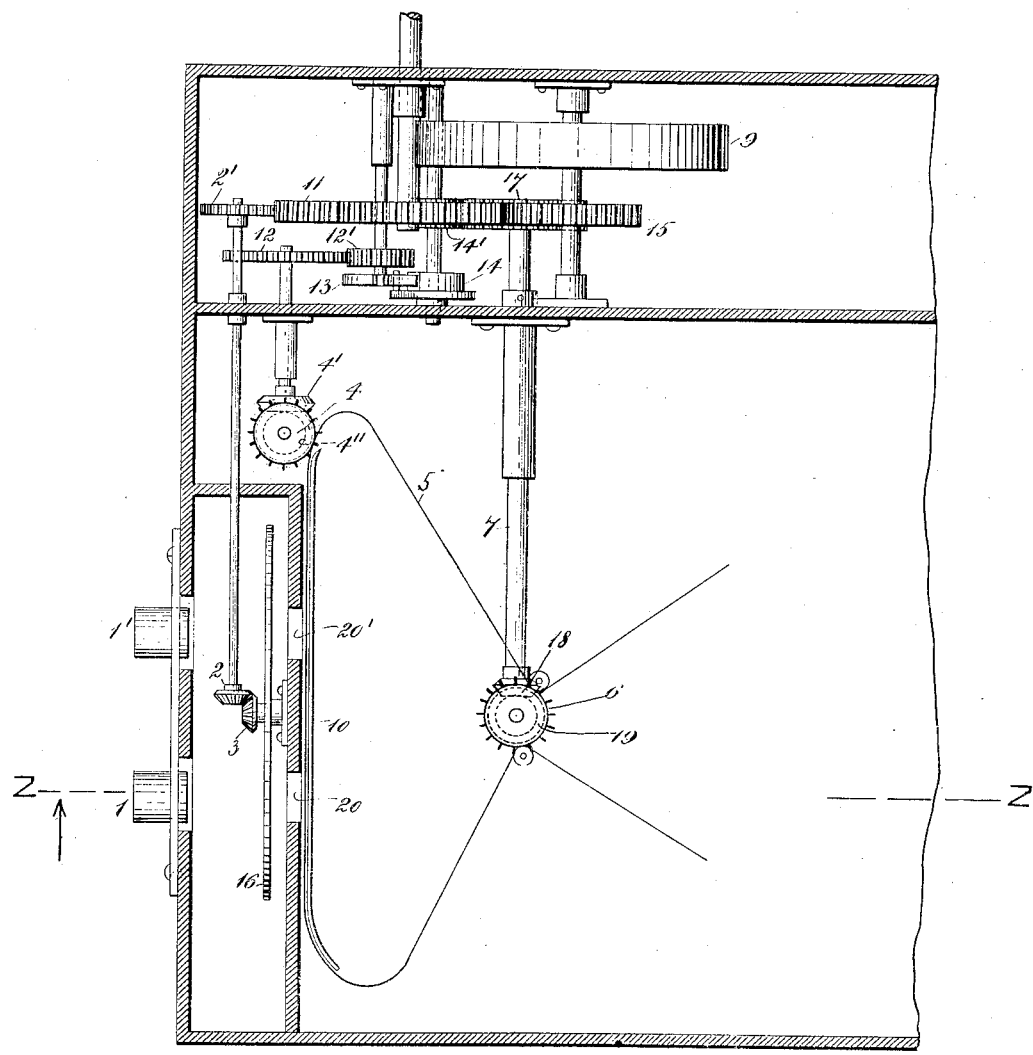
Fig. 1 is a horizontal section showing most all gears on left side of camera.

In Fig. 1, which represents a cross-sectional plan view, 1 and 1′ represent a pair of stereoscopic lenses which are in a true horizontal alinement, to correspond to positions of images on film, as in Fig. 9, according to the portion of film which the right and left views are intended to occupy.

Figure 2:
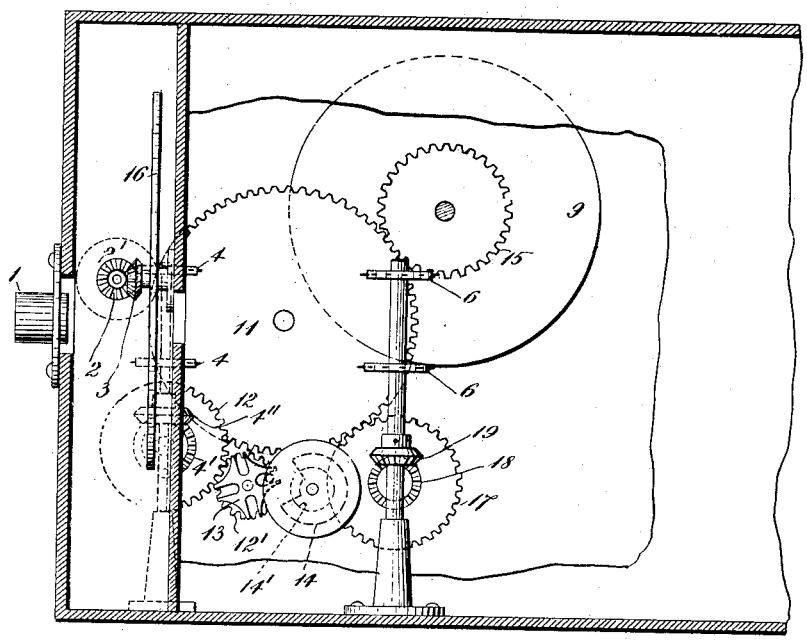
Fig. 2 is a vertical section on line 2—2 of Fig. 1, showing position of gears attached to left wall of camera.

The shaft upon which gears 2 and 2′ rest runs in a horizontal direction and in the same direction of length of film, the shaft being higher than position of left or right lens as indicated in Fig. 2 in order not to interrupt the path through which the light rays travel from lens 1′ to film at 20′ in Fig. 1, 2 and 2′ being so geared to gears 11 and 3 to revolve shutter 16 eight times per each turn of camera handle or to each revolution of gear 11; 4 represents the sprocket wheel which pulls film thru film aperture. This sprocket wheel and shaft upon which it rests being in a vertical direction, and meshing gears 4″ to 4′, 12 to 12′; upon the same shaft of 12′ is the master gear 11 and also the Maltese cross part of the intermittent motion. With such a combination, one revolution of master gear 11 will cause sprocket wheel 4 to pull film through film aperture eight image widths in distance, to be further explained. It is to be noticed that sprocket wheel pulling film through film aperture is not on the same shaft of either of the two parts of the two Maltese cross parts. 5, represents the moving picture film; 9, represents the balance or fly wheel, being revolved by means of meshing of gears 15 and 11; 10, represents film gate; master gear 11 meshing with 14′ gear revolving the intermittent motion 14 and 13; master gear 11 meshing with 17 revolving gears 18, 19, and sprocket wheel 6.

In Figs. 1 and 2 the gears 2′, 11, 12, 12′, 13, 14, 14′, 15, 17, and balance wheel 9, are all placed on left side of camera and enclosed in a partition.

Figure 3:
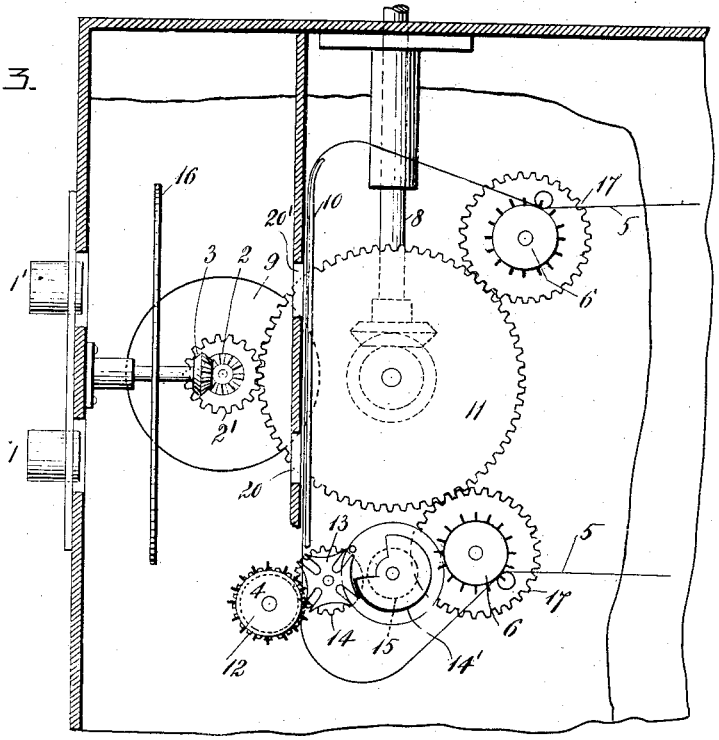
Fig. 3 is a horizontal section, showing a modification of the position of the gears at lower bottom part of camera.
Figure 4:
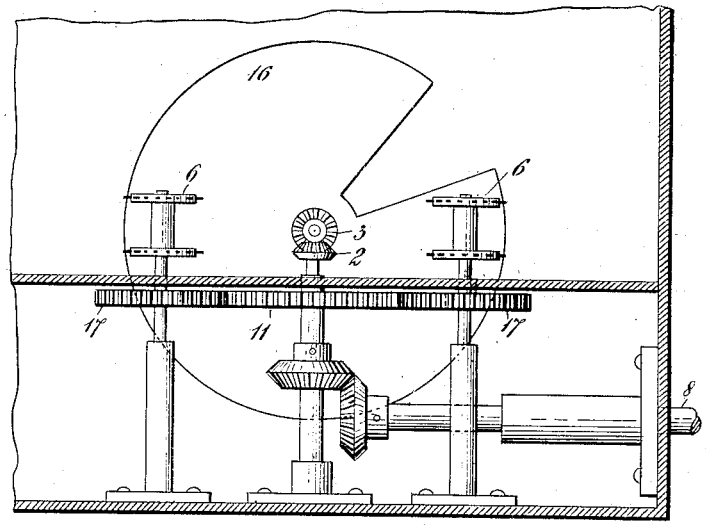
Fig. 4 is a rear elevation of the same, the casing being in section, showing a back view of gears at bottom part of camera and shutter in front.

Fig. 3 represents a cross-sectional plan view of another style stereoscopic camera, having the majority of gears at the lower partition of camera, otherwise the general principle being the same as in Figs. 1 and 2. In both styles of cameras, Figs. 1 and 3, the sprocket wheel which pulls the film through film gate is not on the same shaft upon which the two parts of the Maltese-cross intermittent gear rests.

Figure 5:
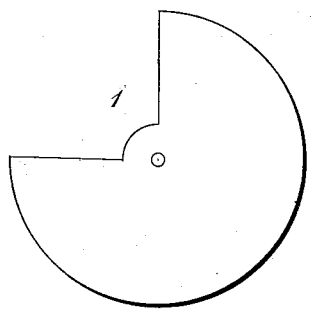

In Fig. 5, the shutter has an opening 1 which is equal to ¼ the circumference of shutter and is intended to be employed when left and right exposures are made at different periods of time, during the same period of rest of film, such an opening allowing the maximum of time of exposure and minimum of period of time between the exposure for left and right pictures. Shutter making one complete revolution during one period of rest and motion of film.

Figure 7:
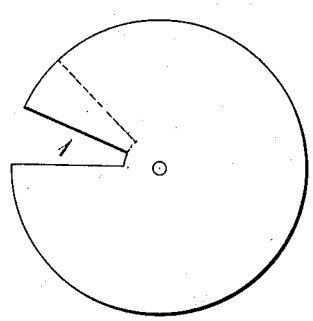

In Fig. 7, the shutter has an opening 1 which may be 1/8 to 1/16 or less the circumference of shutter and is intended to be employed when left and right exposures are made at different periods of time during the same period of rest of film, such opening allowing the minimum of time of exposure and maximum of period of time between the exposure of left and right pictures.

Figure 6:
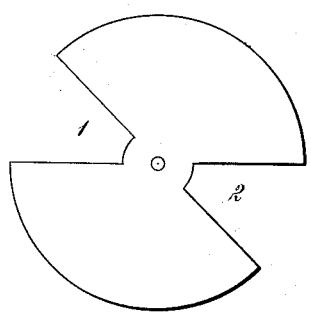

In Fig. 6, the shutter has two openings 1 and 2, which may be each 1/8 or less the circumference of shutter and is intended to be employed when left and right exposures are made at the same period of time during the same period of rest of film.

In Fig. 9, there are two openings in film gate, 20 and 20′, 20 representing opening for right angle exposure and 20′ representing opening for left angle exposure. Both openings being of same size, one inch in height and 3/4 inch in width each. The distance between the two innermost edges of width of openings being equal to two image widths or one and one half inches. Both openings being in horizontal alinement.

Fig. 10, is intended to show the position of shutter 16 when the three color process is used for natural color photography in conjunction with stereoscopic moving pictures. The shutter 16 being a combination of three opaque sections and three color screen sections as in Fig. 8; such a combination screen being supported upon a rod or shaft which is to the right of both lenses. The screen shutter in Fig. 8 being so geared that there are eight complete revolutions per each turn of master gear 11, and sprocket gear pulling film through film gate so geared to correspond to 24 rests and 24 advancements of film of lengths each equal to widths of images.

Figure 8:
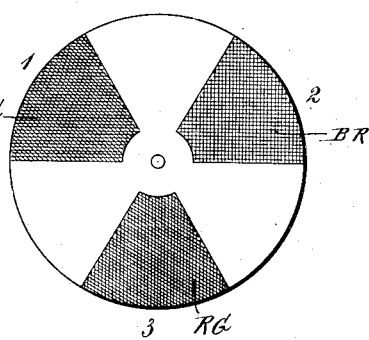

In Fig. 8, BG represents blue-green filter, BR represents blue-red filter, RG represents red-green filter.

In this invention three different sizes of images have been mentioned, each of which requires some difference in gearing.

I do not confine myself to the particular style of stereoscopic motion picture camera here shown, but various other changes and modifications, within the skill of those versed in the mentioned arts may be made in such a camera without departing from the spirit of my invention provided the principle set forth in the following claims be employed.

Having thus described my invention, I claim:

1. In a stereoscopic motion picture camera, a casing, a pair of stereoscopic lenses mounted through the front of the casing a binocular distance apart, a shaft mounted horizontally in the casing, a rotary shutter mounted in the casing behind the lenses and connected to the shaft, manually actuated drive mechanism in the casing connected to said shaft for turning the same and rotating the shutter, a film gate arranged in the casing behind the shutter and having two openings in registry with the lenses and adapted to expose two spaced portions of a film in said film gate, a sprocket wheel in the casing engaging the film for drawing the same through the film gate, an intermittent gear connection between the drive mechanism and the sprocket wheel for advancing the film strip, said shutter and drive mechanism being arranged to intermittently expose said two portions of the film through the respective lenses and to advance the film strip between exposures sufficiently to prevent double exposure of said portions of the film strip.

2. In a stereoscopic motion picture camera, a casing, a pair of stereoscopic lenses in the front of the casing, a film gate spaced behind the lenses and having a pair of spaced openings therein registering with the lenses, film feeding means in the casing including an intermittent device for effecting the step by step advancement of the film to consecutively expose different portions of the film at said openings, and a shutter connected to said film feeding means for controlling the exposing of said different portions of the film at said two openings.

3. In a stereoscopic motion picture camera, a casing, a pair of stereoscopic lenses in the front of the casing, a film gate in the casing in registry with the lenses and adapted to support a film, means for intermittently advancing the film through the film gate, a shutter interposed between the film gate and the lenses for controlling exposure of the film at binocular spaced points of the film gate, said casing having a viewing opening in its rear side opposite the lenses, a slide carried by the casing controlling said viewing opening, and means for securing said slide to the casing for sealing said opening.

4. In a stereoscopic motion picture camera, a casing, a pair of stereoscopic lenses arranged in the front wall of the casing at least a binocular distance apart, a film gate in the casing spaced from the lenses and having openings therein in registry with the lenses, means for intermittently feeding a film strip through the film gate for exposing each portion of the film only at one of the openings so that all of the portions of the film are exposed but once during the travel of the film through the film gate, a shutter interposed between the film gate and the lenses for controlling the exposure of the film through said openings of the film gate, a partition in the casing forming a chamber in one portion of the casing, operating mechanism in said chamber of the casing connected to the shutter for actuating the same, and intermittent mechanism interposed between the film feeding means and the operating mechanism for actuating the film in timed relation to the operation of the shutter.

5. In a stereoscopic motion picture camera, a casing, a film gate in the casing having a pair of spaced openings therein, a pair of stereoscopic lenses in the casing in registry with said openings, means for advancing a film through the film gate intermittently and to expose separate portions of the film but once at the openings, and a shutter operatively arranged in the casing between the lenses and the film gate, said shutter having a pair of openings therein for simultaneously registering with said openings to effect simultaneous right and left stereoscopic exposures during each period of rest of the film.

6. A camera for taking stereoscopic pairs of pictures upon standard size film comprising a casing, a film gate having openings spaced substantially a binocular distance apart for slidably receiving a film strip, lenses placed before said openings, a shutter in front of said openings with its axis of rotation offset from the line connecting the two lenses, a shaft likewise off said line connected to rotate said shutter and gear means to rotate said shaft, a Geneva motion also driven by said gear means, a shaft separate and distinct from said Geneva motion but driven thereby, a film advancing means in operative relation wth the film and driven by said last mentioned shaft.

This specification signed and witnessed this 31st day of May, 1922.

CHARLES BOUIN.